Patented June 15, 1926.

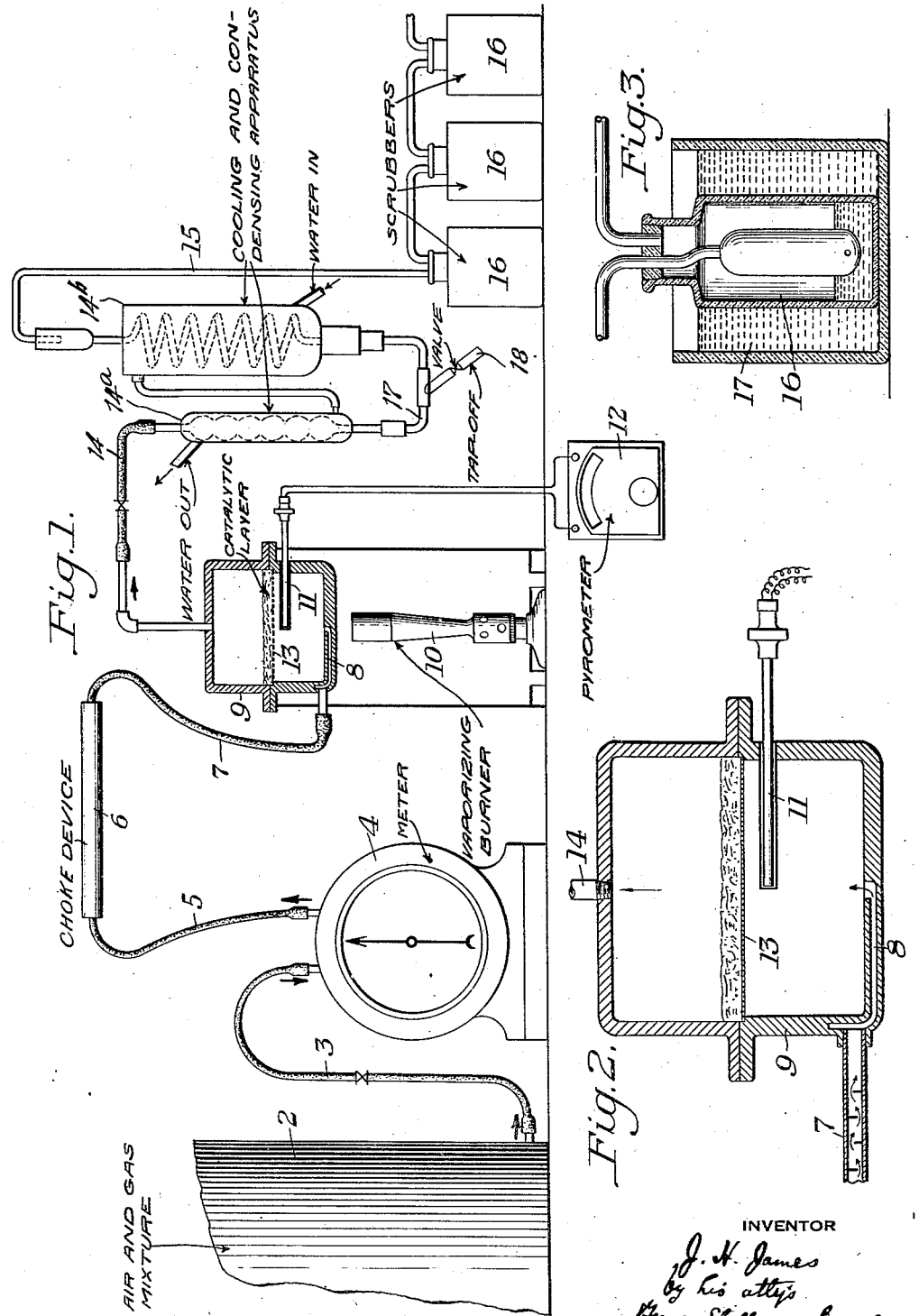

1,588,836

UNITED STATES PATENT OFFICE.

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA.

METHOD OF PARTIALLY OXIDIZING GASEOUS HYDROCARBONS.

Application filed February 26, 1924. Serial No. 695,194.

Figure 1 is a side elevation partly in section showing one form of apparatus for carrying out my invention;

Figure 2 is an enlarged section through the catalytic vessel; and

Figure 3 is a sectional side elevation of one of the absorbers.

My invention relates to the partial oxidation of hydrocarbons which are gaseous at ordinary temperatures and pressures, and is a continuation in part, and presents improvements upon, the invention set forth in my copending application, Serial No. 132,570, filed November 21, 1916.

The invention relates to a partial oxidation of gaseous hydrocarbons, which is controlled within a partial combustion stage by careful control of the conditions as hereinafter set forth.

I may select for the raw material for this process any natural gas consisting essentially of methane or of methane plus ethane, propane and butane; or I may select the propane-butane mixtures now commercially available in natural gas districts.

Also I may use as a raw material any of the industrial byproduct gases containing the above hydrocarbons, such as coal gas, either from ordinary city gas manufacture or from byproduct coke manufacture. A particularly valuable material for this purpose is the gas resulting from the new low-temperature coal-distillation processes, whether these are produced by producer or retort processes.

The gases from the thermal decomposition of petroleum as it is practiced in the new "cracking" operations, are also a commercially available source of hydrocarbons for my partial oxidation process.

In carrying out my process, oxygen, preferably in the form of air, is mixed in certain proportions with the gaseous hydrocarbon, such as natural gas, methane, ethane, propane, butane, or mixtures containing one or more of these, etc., and the mixture is brought in contact with catalytic material under a controlled temperature, and preferably, under certain conditions as regards the time of contact or time of sojourn of the mixture with the catalyst. The reactions are controlled so as to carry the oxidation to a point short of complete combustion, thus giving intermediate products, such as aldehydes and acids.

In the examples hereinafter recited, the catalyst consisted of molybdenic oxide, but it will be understood that other oxides and compounds of the high melting point electro-negative low atomic volume metals, such as molybdenum, vanadium, manganese, tungsten, uranium, chromium, titanium, zirconium and thorium may be used. The oxides of these metals may be mixed with each other or compounds of one metal with another may be used, with or without other metallic oxides. I have also found that silver oxide may be used in this connection.

The temperature is preferably controlled partially by regulable heat application underneath the retort or vessel in which the reaction takes place, also by the proportions of air or oxygen and gas employed, and if desirable, artificial cooling may also be introduced at or about the catalyst.

The temperature at the catalyst is preferably so regulated that there is no substantial volatilization of the catalyst. For example, I have found that molybdic oxides begin to volatilize at about 650° C., and therefore, in using such oxides as a catalyst, I preferably keep the temperature thereof below this point and preferably in the neighborhood of about 550° C. With natural gas or methane, the desired reaction is faint at 300° C., noticeable at 400° C., measurable at 500° C. and very active at 550° C. At above 550° C. to 600° C., the reaction begins to drop off slowly, and therefore, particularly when molybdic oxides are used, I preferably maintain a temperature of from 500° to about 600° C.; and more specifically about 550° C.

I will now describe one form of apparatus which I first employed.

In the drawings, 2 represents a reservoir of mixed air and gas under slight pressure, from which the mixture passes through a valved pipe 3 to a gas meter 4. From the meter the mixture passes through a choke device 6 to prevent back firing into pipe 7, and thence into the inlet passage 8 of the catalytic vessel 9. This inlet passage is preferably arranged as shown, so that the mixture will be heated before entering the catalytic chamber. The vessel is heated by any suitable means as, for example, a gas burner, or burners 10, the temperature being carefully regulated to give the desired partial oxidation results. For this purpose, I show a pyrometer couple 11 in the catalytic vessel, extending through its wall and having wires leading to the external temperature indicator 12. This catalytic chamber is preferably provided with a diaphragm 13 of wire gauze on which rests a layer of loose catalytic material, such as above named.

As the gaseous mixture passes through this catalytic material under the regulated temperature above referred to, the hydrocarbon will be partially oxidized to an intermediate stage short of complete combustion, such as the aldehyde stage.

The mixture then passes from this vessel through a valved pipe 14 to a cooling and condensing system which, as shown, consists of a Liebig condenser 14$^a$ and a spiral condenser 14$^b$. The inner tube of the Liebig condenser connects through pipe 17 with the lower end of the worm of condenser 14$^b$ and this connection has a valve tap-off 18. From this condensing system the pipe 15 leads the uncondensed remainder into a series of scrubbers or absorption vessels 16. These vessels are preferably arranged in the general manner shown in Figure 3, the gas entering each one below the surface of the liquid and the surplus passing over to the next absorption vessel. I have shown each of these absorption wells as surrounded by a water jacket 17.

In using this apparatus I employed a catalytic layer consisting of a mass of asbestos impregnated with a paste of molybdic oxides and dried. The final product contains 77% by weight of the molybdic oxide and this layer was packed loosely on a supporting circular screen and formed a disk 6 inches in diameter and ¼ of an inch thick, weighing about 14 grams, of which 77% was molybdic acid.

The gas employed was the well known natural gas used in the Pittsburgh district, of which about 85% was methane.

Experiments were run to determine one of the most important factors, which is the ratio or volume of the gas to the air. These experiments demonstrated that at the desirable temperature, around 550° C., the ratios should be one volume of gas to not over 3½ of air, and preferably one volume of gas to about one volume of air. The percentage of air may be lower than that of the gas by volume, but should in no case be over 3½ times that of the gas, and my best results were obtained with one volume of gas to one volume of air. After this set of experiments with varying ratios of air to gas, I then carried out a set of experiments to determine the proper rate of flow, and hence the proper time of sojourn or contact with the catalyst. These experiments showed that under the conditions above named, the best results were obtained by a rate of flow of about two liters per minute of the mixture containing one volume of gas to about one volume of air. This gave about one second for the time of contact or time of sojourn with the catalyst; but I may vary this from ¼ of a second to four seconds as the time of sojourn, although my best results were obtained with one second as the time of sojourn, this being, as above stated, at the rate of two liters per minute for the best mixture. "By time of sojourn" I mean the time it takes a molecule of the gas mixture to pass the catalytic layer.

Additional experiments were also carried out with the prefered ratio of one of gas to one of air and with the preferred time of sojourn of one second (a two liter flow per minute with the above apparatus). These tests showed that the percentage of valuable products under these conditions rose to a point around 550° C., and gradually dropped off so that I consider my best results to be obtained around 550° C. and not above 600° C. to 625° C.

In all cases, I have found that the gaseous products from the operation contain free oxygen. In fact, owing to the fairly low percentage of conversion, usually the major part of the oxygen fed in is present in the gaseous products. The products are aldehydes and acids, and in the case above recited, formaldehyde and some formic acid. Steam, of course, is formed which is condensed in the system. Part of the formaldehyde may be obtained in the water of condensation as well as in the scrubbers and these solutions of formaldehyde may be concentrated in well known ways. It will be understood that the water of condensation is the water formed in the reaction. This water mostly condenses before the scrubbing system is reached and may be taken out through the tap-off. I may use a saturated sodium acid sulphite solution in some or all of the direct contact absorbers. which will react with the formaldehyde and form marketable products. Or for example, I may employ ammonium hydroxide or ammonium carbonate solution in the scrubber to form hexamethylene tetramine direct from the formaldehyde contained in the gas screen. I may also employ silver oxide as the catalytic material, and in this or any case, I may further activate the operation by passing the air first through an ozonizer or ozone machine on its way to the reaction zone and before mixing with the gas. This enables the operation to be carried out at lower temperature.

The formaldehyde stage probably precedes the acid stage, the oxidation probably being progressive. This may be controlled to some extent by control of the factors above recited, particularly the temperature.

It is desirable, owing to the fairly low percentage of recovery, to pass the mixture of gaseous hydrocarbon and air through a series of units, such as shown, each made up of catalyzing apparatus with the necessary absorption or condensing and absorption vessels, in order to obtain the desired yield of the intermediate products, such as aldehydes. The treatment of the usual products will depend somewhat upon the particular gaseous hydrocarbon treated. Under the best conditions above named, the formaldehyde produced, when concentrated to a 40% solution, amounted to 6.75% based on the weight of the methane treated.

It will be understood that various forms of apparatus may be employed, the depth of the catalytic layer may be varied, the temperature and other factors may be varied somewhat according to the particular catalyst used, the pressure may be above or below atmosphere, and other variations may be made, without departing from my invention.

It will be noted that the invention is especially applicable to gaseous aliphatic hydrocarbons or hydrocarbon derivatives having saturated bonds, although it may be applied to gaseous hydrocarbons having unsaturated bonds.

I claim:

1. In the method of making intermediate oxidation products from hydrocarbons which are gaseous at normal temperatures and pressures, the steps consisting of forming a mixture of said hydrocarbons and oxygen in the proportion of about one volume of gas to not over three and one-half volumes of air, and passing said mixture in contact with a solid catalyst at a temperature not exceeding 600° C.

2. In the method of making intermediate oxidation products from hydrocarbons which are gaseous at normal temperatures and pressures, the steps consisting of forming a mixture of the gaseous hydrocarbon and oxygen in the proportion of one volume of gas to less than three and one-half volumes of air and passing the mixture in contact with a solid catalytic layer of metal compounds while maintaining the temperature below 600° C.

3. In the method of making intermediate oxidation products from hydrocarbons which are gaseous at normal temperatures and pressures, the steps consisting of forming a mixture of the gaseous hydrocarbon and oxygen in the proportion of one volume of gas to less than three and one-half volumes of air and passing the same through a catalytic zone under conditions which leave free oxygen in the outlet gases.

4. In the method of making intermediate oxidation products from hydrocarbons which are gaseous at normal temperatures and pressures, the steps consisting of forming a mixture of gaseous hydrocarbon and oxygen and causing it to flow in contact with the catalyst with the time of sojourn of between one-quarter of a second and four seconds.

5. In the method of making intermediate oxidation products from hydrocarbons which are gaseous at normal temperatures and pressures, the steps consisting of forming a mixture of gaseous hydrocarbon and oxygen and causing it to flow in contact with the catalyst with the time of sojourn of between one-quarter of a second and four seconds, and maintaining conditions such that free oxygen appears in the outlet gas.

6. In the method of making intermediate oxidation products from hydrocarbons which are gaseous at normal temperatures and pressures, the steps consisting of forming a mixture of gaseous hydrocarbon and oxygen in the proportion of one volume of gas to less than three and one-half volumes of air, and passing the same in contact with a catalyst with the time of contact between one-fourth of a second and four seconds.

7. In the method of making intermediate oxidation products from hydrocarbons which are gaseous at normal temperatures and pressures, the steps consisting of forming a mixture of gaseous hydrocarbon and oxygen in the proportion of one volume of gas to less than three and one-half volumes of air and passing the same in contact with a catalyst at a temperature in the neighborhood of 550° C.

8. In the method of making intermediate oxidation products from hydrocarbons which are gaseous at normal temperatures and pressures, the steps consisting of passing a mixture of gaseous hydrocarbon and oxygen in the proportion of one volume of gas to less than three and one-half volumes of air in contact with a catalyst, containing the compounds of metals at a temperature below the volatilizing point of said compounds.

9. In the method of making intermediate oxidation products from hydrocarbons which are gaseous at normal temperatures and pressures, the steps consisting of forming a mixture of gaseous hydrocarbon and oxygen, and passing the same in contact with a catalyst with the time of contact ranging between one-fourth of a second and four seconds and at a temperature below 650° C.

10. In the method of making intermediate oxidation products from hydrocarbons which are gaseous at normal temperatures and pressures, the steps consisting in forming a mixture of gaseous hydrocarbon and oxygen in the proportion of one volume of gas to less than three and one-half volumes of air, and passing the same in contact with a catalytic layer containing the compounds of a high melting point low atomic volume electronegative metal.

11. In the method of making intermediate oxidation products from hydrocarbons which are gaseous at normal temperatures and pressures, the steps consisting in forming a mixture of gaseous hydrocarbon and oxygen in the proportion of one volume of gas to less than three and one-half volumes of air, and passing the same in contact with a catalytic layer containing the compounds of a high melting point low atomic volume electronegative metal at a temperature below 650° C.

In testimony whereof I have hereunto set my hand.

JOSEPH HIDY JAMES.